H. Z. KLINE.
PROCESS AND APPARATUS FOR MAKING CEMENT OR CONCRETE BUILDING STONE.
APPLICATION FILED AUG. 18, 1914.
1,164,099.  Patented Dec. 14, 1915.
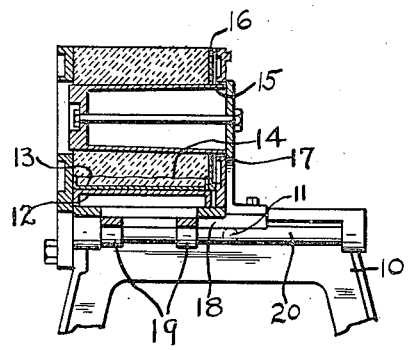
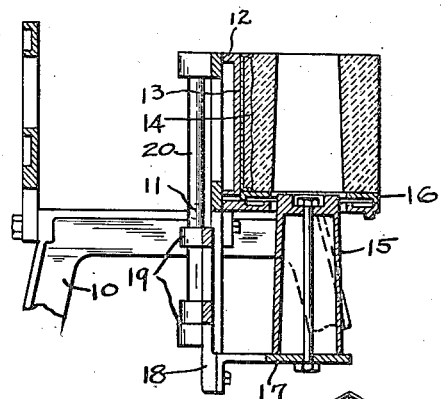
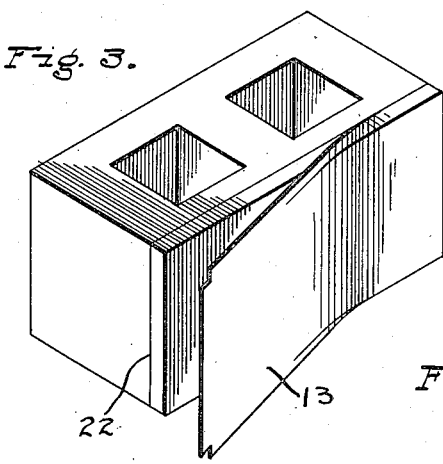
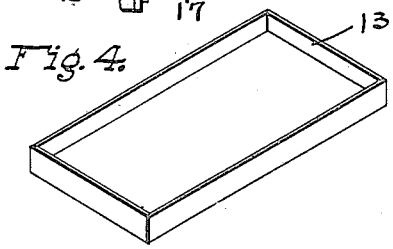
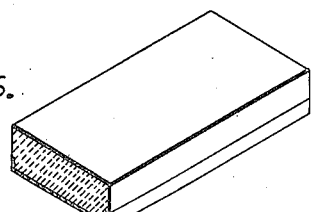
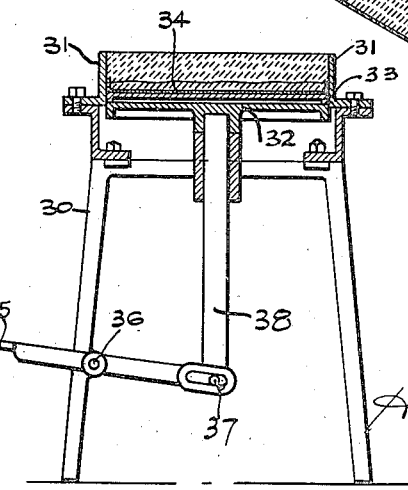
WITNESSES:
INVENTOR
Harry J. Kline

UNITED STATES PATENT OFFICE.

HARVEY Z. KLINE, OF INDIANAPOLIS, INDIANA, ASSIGNOR OF ONE-HALF TO JOHN W. BARKALOW, OF INDIANAPOLIS, INDIANA.

PROCESS AND APPARATUS FOR MAKING CEMENT OR CONCRETE BUILDING-STONE.

1,164,099.  Specification of Letters Patent.  Patented Dec. 14, 1915.

Application filed August 18, 1914. Serial No. 857,319.

*To all whom it may concern:*

Be it known that I, HARVEY Z. KLINE, a citizen of the United States, residing at Indianapolis, in the county of Marion, State of Indiana, have invented new and useful Improvements in Processes and Apparatus for Making Cement or Concrete Building-Stone.

The object of my invention is to provide an economical process for making concrete building stone with a veneered face of granite, marble and the like, in which the mixture which forms the face of the stone is poured into the mold wet. The advantage of pouring the mixture into the mold wet is to produce a harder and more dense stone than is procured by the present method of making stone, thus getting a practically moisture-proof building block.

Manufacturers of concrete stone have found that the use of comparatively dry material is necessary in making stone so as to enable them to get it out of the mold. Stone made from dry material is porous and when dry absorbs moisture from the air and ground and causes buildings built with them to become damp in wet weather. Were the stones made from a wet mixture, they would stick to the sides and face of a mold making it hard to remove them. A separate mold will be required for each stone as the wet material would run and lose its shape if the support of the mold were taken from it. This method will be uneconomical as the users of it would have to equip themselves with hundreds of costly molds. My invention will enable the manufacturers to make the stone with a wet face which can be of ordinary cement, granite, marble, or other costly building material and which can be removed from the mold immediately.

My experiments have proven that if I use a secondary mold made from hard paper which has been covered with paraffin, or like substance, and lay this secondary mold on face-plate of a face-down molding machine, I can pour a wet mixture of cement, granite or other pulverized stone into this secondary mold and make the balance of the stone of common concrete in the ordinary manner. This stone can be removed from the mold immediately on the pallet with the face of the stone in a vertical position. When the stone is sufficiently set, the paraffin secondary mold is easily removed, leaving a thin film of cement on the face which can be scrubbed off. Removing this film of cement from the face of the stone leaves the natural face of the granite or other building material exposed.

If the mold be made of paper which is unprepared, I have found that when the stone is set that I cannot remove this paper as it is porous and the cement in the stone adheres to it so the only way to get it off is to polish or scrape the stone.

In the accompanying drawing, Figure (1) is a section through the core of the molding machine with the core ready to be removed. Fig. (2) is a section through the core of the molding machine with the core removed and the stone ready to be taken off. Fig. (3) is a perspective drawing of a stone with the secondary paraffin mold partially removed. Fig. (4) is a perspective drawing of the secondary mold. Fig. (5) is a modified form of the mold showing how this method can be applied to making a thin veneered stone such as can be used in houses where a veneered finish is required. Fig. (6) is a perspective sectional view of the stone in the mold of Fig. (5).

In detail, (10) is the supporting member of the mold; (11) is a pivot on which the mold swings; (12) is face plate on which the face of the stone is cast; (13) is a secondary mold described heretofore; (14) is a line representing the thickness of the wet mixture; (15) is the core of the molding machine; (16) is the pallet on which the stone is carried away; the core (15) is supported by a bracket (17), which in turn is fastened to a sliding member (18), which has bosses (19) secured to it which slide backward and forward on the shaft (20).

In the modified form (30) are the supporting members of the mold (31) in which a reciprocating member (32) slides. On this reciprocating member is placed a face plate (33) on which the secondary mold (34) is set. When the block is completed, the operator presses on the lever (35) which is pivoted to the main frame (30) at the pivot point (36) and the other end of which is secured by means of a pin (37) to a shaft (38). Pressing on this lever (35) the reciprocating member (32) is forced upwardly through the mold (31) allowing the operator to remove the stone and carry it away on the face plate (33).

As shown in Fig. (3), the line (22) represents the joining point made when the secondary mold is removed. The edge formed by this secondary mold is smooth and allows the mason to make a neat joint between the stones.

What I claim as my invention and desire to secure by Letters Patent is:—

1. The process of making artificial stone, which comprises placing within a main mold a secondary mold of flexible material which conforms in shape and size to the bottom of the main mold and has side walls which extend upward along the sides of the main mold, pouring into said secondary mold a wet concrete mixture to a depth not exceeding the height of the side walls of the secondary mold, placing upon said layer of wet mixture a layer of moist but relatively dry concrete mixture to make a stone of the desired thickness, removing the formed stone and secondary mold together from the main mold before the stone has set, allowing the stone to set with the layer of wet mixture supported by said secondary mold, and removing the secondary mold from the stone after the stone has set.

2. The process of making artificial stone, which comprises placing within a main mold a secondary mold of flexible material which conforms in shape and size to the bottom of the main mold and has side walls which extend upward along the sides of the main mold, pouring into said secondary mold a wet concrete mixture, placing upon said layer of wet mixture a layer of moist but relatively dry concrete mixture to make a stone of the desired thickness, removing the formed stone and secondary mold together from the main mold before the stone has set, allowing the stone to set with the layer of wet mixture supported by said secondary mold, and removing the secondary mold from the stone after the stone has set.

3. The process of making artificial stone, which comprises placing within a main mold a secondary mold of paraffined paper which conforms in shape and size to the bottom of the main mold and has side walls which extend upward along the sides of the main mold, pouring into said secondary mold a wet concrete mixture to a depth not exceeding the height of the side walls of the secondary mold, placing upon said layer of wet mixture a layer of moist but relatively dry concrete mixture to make a stone of the desired thickness, removing the formed stone and secondary mold together from the main mold, and removing the secondary mold from the stone after the stone and secondary mold have been removed from the main mold and after the stone has set.

4. The process of making artificial stone, which comprises placing within a main mold a secondary mold of paraffined paper which conforms in shape and size to the bottom of the main mold and has side walls which extend upward along the sides of the main mold, pouring into said secondary mold a wet concrete mixture, placing upon said layer of wet mixture a layer of moist but relatively dry concrete mixture to make a stone of the desired thickness, removing the formed stone and secondary mold together from the main mold, and removing the secondary mold from the stone after the stone and secondary mold have been removed from the main mold and after the stone has set.

5. In combination, a molding machine having a mold formed of side walls and a face plate with the face plate at the bottom, and a removable secondary mold of paraffined paper which has a bottom conforming in size and shape to the face plate and has side walls which extend upward along the side walls of the main mold.

6. The process of making artificial stone, which comprises placing within a main mold a secondary mold of paraffined paper which conforms in shape and size to the bottom of the main mold and has side walls which extend upward along the sides of the main mold, which side walls can be moved relatively to the bottom of said secondary mold when not restrained by the main mold, pouring into said secondary mold a wet concrete mixture to a depth not exceeding the height of the side walls of the secondary mold, placing upon said layer of wet mixture a layer of moist but relatively dry concrete mixture to make a stone of the desired thickness, removing the formed stone and secondary mold together from the main mold, and removing the secondary mold from the stone after the stone and secondary mold have been removed from the main mold and after the stone has set, by moving the side walls relatively to the bottom of the secondary mold to strip them from the stone.

7. The process of making artificial stone, which comprises placing within a main mold a secondary mold of paraffined paper which conforms in shape and size to the bottom of the main mold and has side walls which extend upward along the sides of the main mold, which side walls can be moved relatively to the bottom of said secondary mold when not restrained by the main mold, pouring into said secondary mold a wet concrete mixture, placing upon said layer of wet mixture a layer of moist but relatively dry concrete mixture to make a stone of the desired thickness, removing the formed stone and secondary mold together from the main mold, and removing the secondary mold from the stone after the stone and secondary mold have been removed from the main mold and after the stone has set, by moving the side walls relatively to the bottom of the secondary mold to strip them from the stone.

8. In combination, a molding machine having a mold formed of side walls and a face plate with the face plate at the bottom, and a secondary mold of paraffined paper which has a bottom which conforms in shape and size to the face plate and which has side walls which are separately movable relatively to the bottom and extend upward along the side walls of the main mold.

HARVEY Z. KLINE.

Witnesses:
  J. K. SWAN,
  J. O'BRIEN.